United States Patent [19]

Hoos

[11] 4,215,847

[45] Aug. 5, 1980

[54] PLUG VALVE WITH LINER

[76] Inventor: Pieter F. Hoos, 1630 Yeager Rd., Royersford, Pa. 19468

[21] Appl. No.: 830,741

[22] Filed: Sep. 6, 1977

[51] Int. Cl.² ............................................. F16K 5/02
[52] U.S. Cl. .................................... 251/317; 251/309
[58] Field of Search ............... 251/309, 317, 360, 316; 277/171

[56] References Cited

U.S. PATENT DOCUMENTS

| | | | |
|---|---|---|---|
| 415,685 | 11/1889 | Smith | 251/309 |
| 3,133,722 | 5/1964 | McGuire et al. | 251/309 |
| 3,199,835 | 8/1965 | Freed | 251/309 |
| 3,206,163 | 9/1965 | Freed | 251/309 |
| 3,310,278 | 3/1967 | Smith | 251/317 |
| 3,442,490 | 5/1969 | Smith | 251/317 |
| 3,498,318 | 3/1970 | Duffey | 251/317 |
| 3,521,856 | 7/1970 | Smith | 251/309 |
| 3,589,679 | 6/1971 | Birk | 251/317 |

Primary Examiner—William R. Cline

Assistant Examiner—H. Jay Spiegel

[57] ABSTRACT

A plug valve comprising a body with a cylindrical or conical cavity to receive a sealing liner and a complementary plug. A pair of vertically disposed, parallel ribs extend inward from the surface of the body cavity along each side of each flow passageway forming between them a dovetail groove which increases in radial depth from adjacent the top of the body port to a level near the bottom thereof. The outer surface of the liner has a vertical groove spaced from each side of the flow port therein to form, with such flow port sides, vertical dovetail which are secured between the ribs simply by pressing the liner down into the body cavity. The ports in the plug and liner are rectangular, whereby when conical, the lower portion of the flow passages and ports encompass a greater circumferential angle than do the upper portions. Hence, initial flow when the valve opens is at the lower portion where the dovetail interlock is greatest.

11 Claims, 5 Drawing Figures

PLUG VALVE WITH LINER

BACKGROUND OF THE INVENTION

This invention relates to lined plug valves and, more particularly, to plug valves which include a liner of lowfriction, resilient material to provide a seal between valve body and plug and, in addition, to facilitate turning of the plug. The material most commonly used in such plug valves is polytetrafluoroethylene (PTFE) and considerable difficulty has been experienced in seal retention, primarily because of the lack of elasticity of PTFE which makes is deform under differential pressure. Hence, the material tends to bend into the valve passageway under flow forces whereby it may be severed by subsequent rotation of the valve plug.

OBJECTS OF THE INVENTION

It is an object of this invention to provide a lined plug valve with positive interlock means for retaining the liner.

It is a further object of this invention to provide a plug valve with a sealing liner which is easily replaced in the field.

It is a further object of this invention to provide a lined plug valve with means for minimizing the surge of pressure flow on initial opening of the valve.

It is a further object of this invention to provide a lined plug valve which is relatively simple and economical to manufacture, which is reliable in operation.

Other objects and advantages of this invention will become apparent from the description following, particularly when read in conjunction with the accompanying drawings.

SUMMARY OF THE INVENTION

In carrying out this invention, there is provided a plug valve body having a circular cavity which is preferably frusto-conical in configuration. Flow passageways in the valve body open into the cavity at body flow ports which are generally rectangular in configuration, as is the flow passageway through the plug. A liner or sleeve of suitable material, such as polytetrafluoroethelene, also has rectangular flow ports and inner and outer surfaces which are complementary to those of the valve cavity and plug, respectively. Parallel and adjacent to each side of each body port is a pair of vertical ribs with opposing surfaces undercut to form a dovetail configuration. Grooves are formed in the back of the liner complementary to those ribs which are spaced from sides of the flow port whereby the edge portions of the sleeve between such grooves and the sides of the flow port are received between the pairs of body ribs in firm, dovetail interlocks. Since the dovetail interlocks are all parallel to the vertical axis the sleeve is easily replaced simply by dropping it in the body cavity and pressing it in place. With the flow ports being rectangular they will, on a conical plug and liner, encompass a maximum circumferential angle near the lower portion of the port where the circumference is smaller. This ensures that during movement from closed to open position, the lower portions of the port are exposed to the body flow passages first, to provide initial limited flow rather than a sudden burst over the full height of the port. The ribs on the body and the grooves in the back of the liner taper at a rate equal to the difference in taper of the body and plug, whereby the ribs are radially thicker at the level near the lower portion of the flow port so that the dovetail interlock is greatest where the initial flow occurs. The back of the seal intermediate the grooves may be of a reduced thickness to enable some expansion away from the plug, reducing friction between plug and liner.

DESCRIPTION OF A PREFERRED EMBODIMENT

Figure 1:
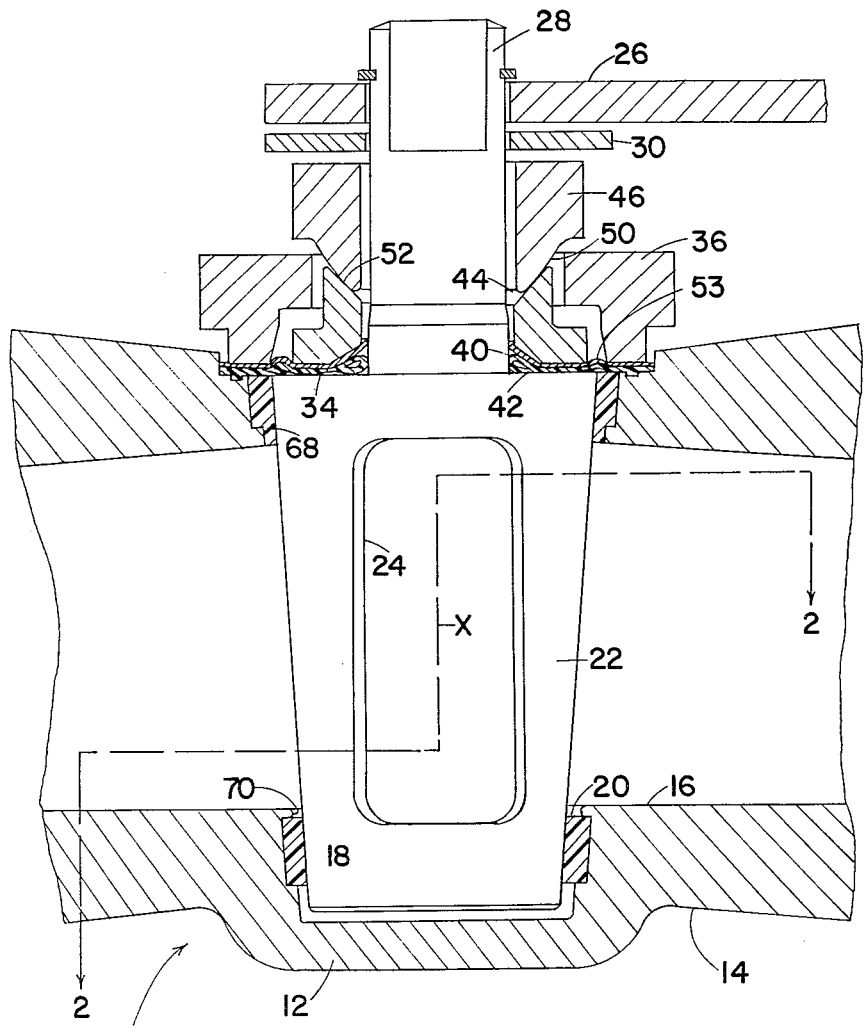
FIG. 1 is a vertical section view of a plug valve embodying features of this invention.
Figure 3:
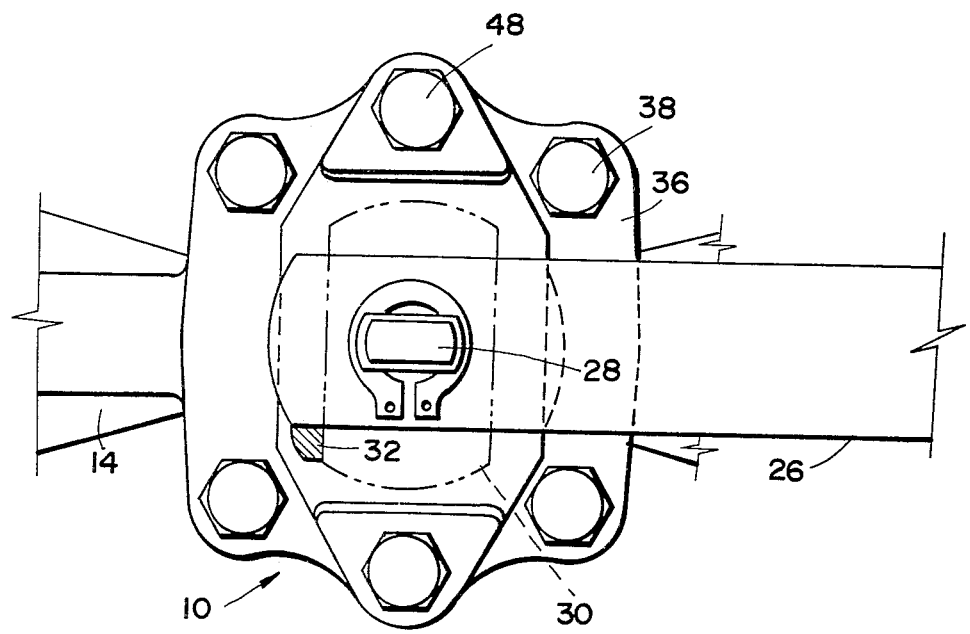
FIG. 3 is a top view of the valve.

Referring now to FIGS. 1 and 3 with greater particularity, there is shown a plug valve 10 including a valve body 12 which may, as shown, be a one-piece casting with integral hubs 14 with flow passages 16, and including suitable means, such as flanges or the like (not shown) for connection of the valve into a pipeline. The flow passageways 16 open into a central frusto-conical cavity 18 on a vertical axis. A frusto-conical liner or sleeve 20 comprising a feature of this invention, is received in the body cavity 18, the liner being of suitable material which is relatively inert chemically and which has a low coefficient of friction, such as polytetrafluorethylene (PTFE). A complementary, frusto-conical plug 22 is received in the liner 20 for 90° rotation from the closed position shown in FIG. 1 to an open position wherein the generally rectangular flow port 24 therein aligns with the body flow passages 16, the plug being operated by any suitable means such as a wrench 26 carried on the upper end of the valve stem 28. A stop bar 30 also non-rotatably carried on the stem 28 engages a stop lug 32 (FIG. 3) to define both open and closed positions of the valve, even if the wrench 26 is removed.

A tight seal around the top of the valve body 12 is accomplished by means of a membrane 34 of PTFE or the like which is clamped around its outer edges between the top closure 36 and the valve body 12, to which the closure is secured by cap screws 38. The membrane 34 is turned under at 40 around a circular central opening 42 which forms a snug fit around the valve stem 28 to effect an annular stem seal. In addition the down-turned lip 40 is forced against the top of the plug 22 by a load ring 44, which in turn is driven down by a gland member 46 which is bolted at 48 (FIG. 3) to the valve body 12. Hence, the lip 40 forms a second annular seal between the force member 44 and the top of the plug 22. It will be noted that a spherical surface 50 on the gland member 46 engages a conical surface 52 on the load ring 44 to insure uniform sealing pressure even though the screws 48 are not threaded uniformly. A metal disc 53 engages between the stem 28 and the valve body closure 36 for grounding and also to prevent membrane 34 from rupturing into the annular space between the cover 36 and the lead ring 44.

Figure 2:
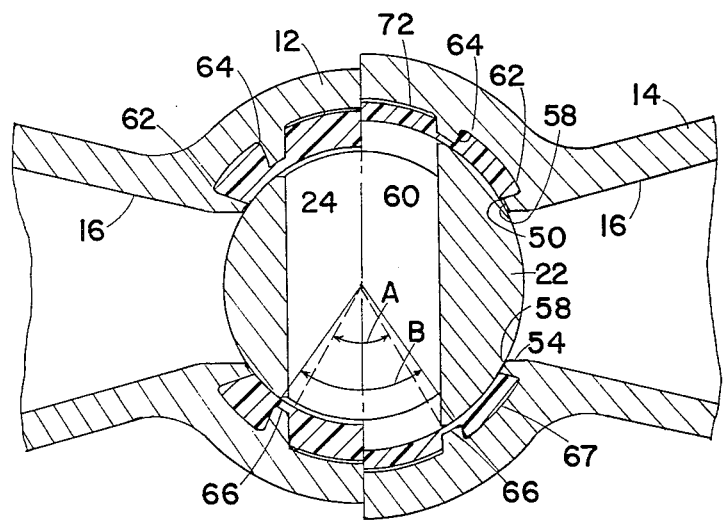
FIG. 2 is a section view taken along line 2—2 of FIG. 1.
Figure 4:
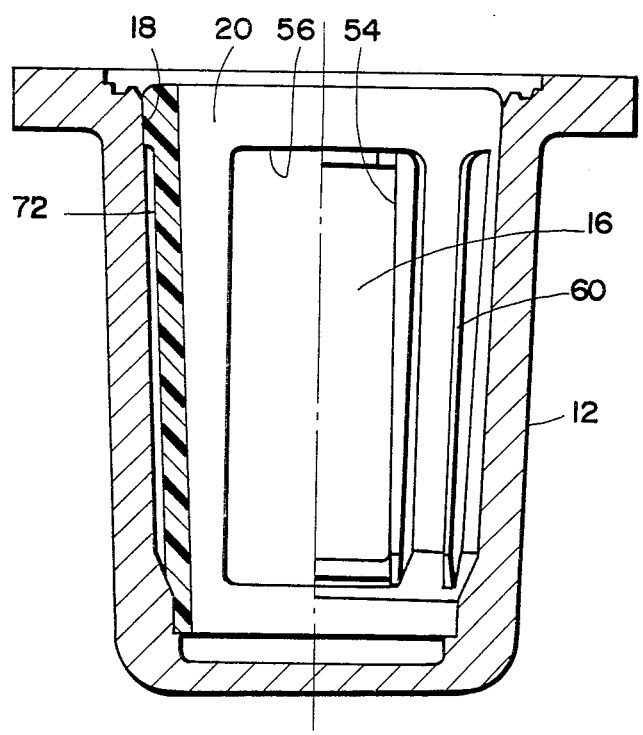
FIG. 4 is a vertical section view through the valve body.

Referring now to FIG. 4 the flow passageways 16 converge from a circular or oval configuration at their outer ends to rectangular flow ports 54 where they enter the frusto-conical recess 18. Similarly, the PTFE liner 20 also has a rectangular port 56, both ports 54 and 56 corresponding with the rectangular opening 24 in the valve plug 22. With a rectangular port on a conical member, the port encompasses a larger portion of the member's circumference at the lower part of the port than at the top where the plug's circumference is larger. That is, it covers a larger portion of the cross-section at the lower, small diameter level. This is illustrated in FIG. 2 which is taken along two levels of the plug 22. The angle B over which the lower part of the port extends is clearly larger than the angle A embraced by the upper part of the part. This of course, is also true of the rectangular port 50 in the sleeve 20. Hence, it is apparent that, when moving from closed to open positions, the lower part of the plug port 24 will reach the rectangular opening 50 in the sleeve 20 first, and initial fluid flow will occur at the lower level to increase gradually toward the top.

Figure 5:
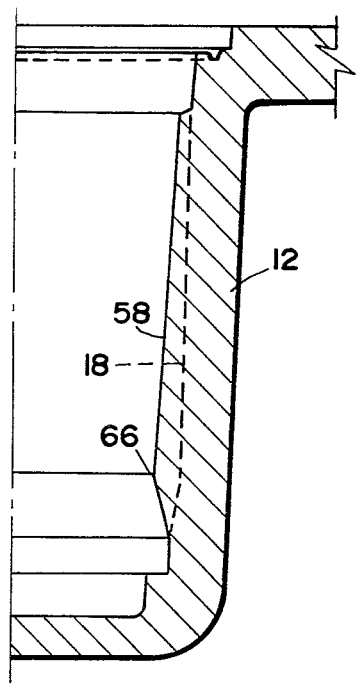
FIG. 5 is a partial section view through the valve body.

Referring now to FIGS. 2, 4 and 5, there are, along and bordering the sides of each port 54 in the valve body, vertical or axial, parallel ribs 58 which extend from a level just above the port to a level just below it, and disposed parallel to each rib 58 is a similar rib 60. The opposing surfaces of the ribs 58 and 60 are undercut at 62 and 64 (FIG. 2) to form a dovetail groove between them. Hence, there are formed by the ribs, four dovetail grooves 90° apart with either a flow passageway 54 or a wall of the body cavity 18 between them.

Vertical grooves 66, complementary to the inner ones 60 of the pairs of ribs, are formed in the back of the liner to form, adjacent the sides of the rectangular port 50, dovetail tongues 67, which are slidably received between the ribs 58 and 60 when the liner 20 is dropped and forced into place in the body cavity 18. With the dovetail grooves 62, 64 in the body cavity and the dovetail tongues 67 on the liner being disposed vertically, the interlock is in the nature of an axial spline shaft connection. Hence, the liner 20 is easily replaced in the field if necessary. If desired, the liner grooves 66 may actually be in the form of slots extending completely through the sleeve 20, since sealing is effected by the liner around the top and bottom portions thereof and by the dovetail tongues 67. That is, no seal is required between the tongues 64.

As shown particularly in FIG. 5, the ribs 58 taper more sharply than the outer surface 18 of the conical body cavity 18 in the valve body 12 whereby the ribs 58 and 60 increase in thickness from top to a maximum at 66 at a level near the lower edge of the port opening 54 in the valve body. Similarly, as indicated in FIG. 2 the liner grooves increase in depth for interlocking accomodation between the ribs 58 and 60. Hence, when the liner is pressed into the valve body the strongest dovetail interlock occurs near the lower portion of liner port 50 as seen in FIGS. 1 and 2, where the initial surge of pressure takes place when the valve is first opened, as previously described.

For further retentive purposes horizontal lips 68 and 70 are provided across the top and bottom of the port 54. In addition, the sleeve 20 is preferably cut away to a reduced thickness at 72. The space between cutaway portion 72 and the tapered inner surface 18 of the body, enables the thinner portion of the liner to expand away from the plug to reduce the area of friction.

While this invention has been described in conjunction with a preferred embodiment thereof, it is obvious that modification and changes therein may be made by those skilled in the art without departing from the spirit and scope of this invention as defined by the claims appended hereto.

What is claimed as invention is:

1. A plug valve comprising:
a body with a cavity of generally circular horizontal cross-sections therein;
flow passages in said body terminating in body ports at said cavity;
a complementary plug in said cavity for rotational movement therein; and
a flow passageway through said plug;
a pre-formed liner of yieldable material in said cavity receiving said plug;
said body having complete annular, top and bottom surfaces within and around said cavity; and
said top surface being larger in diameter than said bottom surface;
a pair of generally parallel, substantially axial ribs extending between said top and bottom surfaces on each side of each body port;
opposing sides of each pair of said ribs forming between them an axial dovetail groove;
the inner surface of said cavity intermediate said ribs merging with said top and bottom surfaces;
said liner having annular top and bottom sealing bands received in said top and bottom surfaces of the body; and
complementary axial dovetail seal strips received between each of said pairs of ribs to form a radially retained positive interlock therewith, said seal strips interconnecting said sealing bands with the outer surfaces thereof merging therewith;
said grooves and said ribs being vertically disposed so that said liner may be inserted axially into said cavity with said seal strips and said ribs interlocked; and
spaces between said pairs of seal strips defining port openings;
the inner surfaces of said sealing bands and seal strips engaging said plug.

2. The plug valve defined by claim 1 wherein:
said ribs increase in radial thickness from said top sealing surface to a level near the bottoms of said port opening.

3. The plug valve defined by claim 2 wherein:
said plug is of frusto-conical configuration; and
said plug flow passageway has generally planar side walls parallel to the axis of said plug.
the opening of said flow passageway encompassing a maximum circumference angle of the plug at about said level so that the covering of said flow passageway by a seal strip during rotation of said plug is progressive.

4. The plug valve defined by claim 2 wherein:
the inner surface of said cavity intermediate said ribs is approximately cylindrical from said top sealing surface down to said level and then tapers in to merge with said bottom surface; and
the inner surfaces of said ribs are frusto conical from said top sealing surface down to about said level.

5. The plug valve defined by claim 1 wherein:
said liner is substantially continuous between said seal strips on each side of each of said port openings; and including;
vertical depressions adjacent said seal strips received on said body ribs, each forming one side of a dovetail seal strip.

6. The plug valve defined by claim 5 wherein:

said continuous portion between said depressions on each side of said port openings is thinner than said seal strips.

7. The plug defined by claim 1 wherein:
said liner is of a material which is sufficiently rigid that assembly is facilitated by axial insertion thereof into said cavity.

8. The plug valve defined by claim 1 wherein:
said plug is of frusto-conical configuration; and
said plug flow passageway and said body ports are complementary and encompass a greater circumferential angle of the plug at the lower end of the flow passageway than at the upper end thereof; and said ribs increase in radial thickness from said upper end of the flow passageway to a level near said lower end.

9. The plug valve defined by claim 1 wherein:
said plug and the inner surfaces of said ribs are frusto-conical; and
said body ports and flow passageway are generally rectangular.

10. The plug valve defined by claim 1 wherein:
all said opposing sides of the ribs are situated on vertical planes.

11. The plug valve defined by claim 10 wherein said vertical planes are parallel to the axis of said cavity.

* * * * *